May 25, 1965  C. A. LOW, JR., ETAL  3,184,915
ELECTROSTATIC PROPULSION SYSTEM WITH A DIRECT
NUCLEAR ELECTRO GENERATOR
Filed Jan. 21, 1963  3 Sheets-Sheet 1

INVENTORS
CHARLES A. LOW JR
WILLIAM R. MICKELSEN

BY

ATTORNEYS

INVENTORS
CHARLES A. LOW JR
WILLIAM R. MICKELSEN

BY

ATTORNEYS

United States Patent Office 3,184,915
Patented May 25, 1965

3,184,915
ELECTROSTATIC PROPULSION SYSTEM WITH A DIRECT NUCLEAR ELECTRO GENERATOR
Charles A. Low, Jr., Cleveland, and William R. Mickelsen, Berea, Ohio, assignors to the United States of America as represented by the Administrator of the National Aeronautics and Space Administration
Filed Jan. 21, 1963, Ser. No. 253,006
24 Claims. (Cl. 60—35.5)
(Granted under Title 35, U.S. Code (1952), sec. 266)

The invention described herein may be manufactured and used by or for the Government of the United States of America for governmental purposes without the payment of any royalties thereon or therefor.

This invention relates generally to propulsion systems and, more particularly, to a propulsion system wherein an electrostatic rocket thruster is embodied with a direct nuclear electro-generator.

Electrostatic rocket thrusters are fairly advanced in research and development and are currently being seriously considered for space exploration because of the relatively high specific impulses that can be obtained therewith. However, with virtually all types of electrostatic rocket thrusters voltages considerably higher than 10,000 volts are desirable. Most of the processes for the generation of electric power to operate electrostatic rocket thrusters employ the conversion of the nuclear energy into heat and conversion of the heat into electricity. This two-step process is embodied, for example, in the nuclear-reactor-turboelectric system, the nuclear-reactor-thermo-electric system, and the nuclear-reactor-thermionic system. The obvious disadvantages of such systems are the weight and complexities of the heat-transfer apparatus and the poor efficiency of the thermodynamic cycle. Of the above-mentioned three systems, it appears that the nuclear-reactor-turboelectric propulsion system has the best performance for space flight. However, it has a relatively high mass per unit output power so that it is only somewhat better than chemical rockets for propulsion on long space flights. In addition to its high mass-to-power ratio, the nuclear-reactor-turboelectric system has many complex moving parts (turbines, pumps, etc.), has a very high temperature fluid system and has a very large radiator-condenser which is subject to serious damage of micrometeroids. The nuclear-reactor-thermionic-converter in which heat from a nuclear reactor is converted into kinetic energy of electrons which, in turn, do work against a small electric field to provide electric power also has a high mass-to-power ratio and other disadvantages which cause to have a performance roughly equal to the nuclear-reactor-turboelectric system. A number of other power generation systems have been conceived in which nuclear energy converted into heat and thence into electric power by thermoelectric means. The nuclear energy in the sytems may either be in the form of a fission reactor or decaying radioisotope. These nuclear thermoelectric systems have the disadvantages of low efficiency and high mass so that their performance is inferior as a power supply for space propulsion systems.

Accordingly, it is a principal object of the present invention to provide an electrostatic propulsion system having a direct-nuclear-electro-generator.

Another object of this invention is to provide a propulsion system having few moving parts and negligible high temperature fluid systems.

Still another object of the instant invention is to provide a new and improved propulsion system utilizing high voltage direct current electric power.

A further object of this invention is to provide a new and novel propulsion system having an electrostatic thruster wherein decaying radioisotopes are utilized for obtaining the high voltages required to operate an electrostatic thruster.

A further object of this invention is to provide a propulsion system capable of making very fast interplanetary flights and having an extremely low mass-to-power ratio.

According to the present invention, the foregoing and other objects are attained by intimately matching an electrostatic rocket thruster with a direct-nuclear-electro-generator. The electro-generator consists of a decaying radioisotope which emits charged particles as it decays and serves as a nuclear energy source in the electro-generator. The emitted particles impinge on into or through a collector, thereby creating an electric potential difference between the emitting surface and the collector. The kinetic energy of the emitted charged particles of electrons is directly converted into electrical energy as the emitted charged particles or electrons do work against an electric field created between the emitting surface and the collector. The emitted particles carry either a positive or negative electric charge, depending upon the type of radioisotope used as the nuclear energy source. When the emitted particle leaves the energy source, the source acquires a charge opposite that of the particle charge and the collector receives a charge corresponding to the particle charge. Thus, the collector and energy source are oppositely-charged, thereby creating an electro-generator cell with a potential difference. The potential difference created in the electro-generator cell is used to accelerate charged propellant particles or molecules in an electrostatic thruster whereby thrust is produced.

A more complete appreciation of the invention and many of the attendant advantages thereof will be readily appreciated as the same becomes better understood by reference to the following detailed description when considered in connection with the accompanying drawings wherein.

Figure 1:
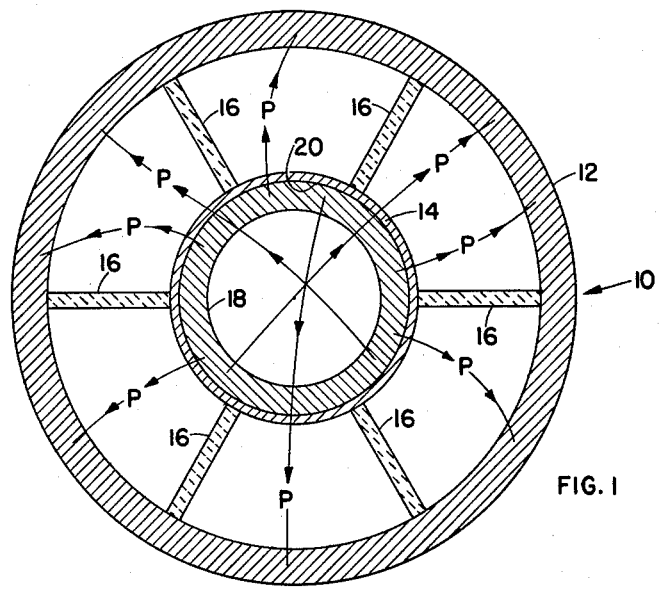
FIG. 1 is a plan view of an electro-generator cell.

Referring now to the drawings wherein like reference numerals designate identical or corresponding parts throughout the several views and, more particularly, to FIG. 1 wherein is shown a direct nuclear electro-generator or atomic battery 10. A collector 12 surrounds and is spatially disposed with respect to a thin support foil or emitter 14 by insulators 16. A coating of a decaying radioisotope or other similar energy source 18 is fixedly deposited on the internal surface 20 of foil 14. A radioisotope or energy source which has the characteristic of a nuclear decay are the Na–22, Ce–Pr–144, Po–210 atoms, which provide positive beta particles (positrons), negative beta particles (electrons), and alpha particles, respectively, for example. The radioisotope may be either a pure radioisotope substance or element and also any material or compound etc. containing the isotope in a chemical combination, as in alloy, suspension, or any other mixture. Emitted particles from the aforementioned radioactive fuel will carry either a positive (alpha particles or positrons) or negative (electrons) electric charge, depending upon the type of radioisotope used as a nuclear energy source. The paths of particles (P) given off are shown as traveling from the decay site of the radioisotope in various directions. However, statistics show that equal numbers in all directions occur when averaged over sufficient events. When the emitted particles from the radioisotope coating are alpha particles, for example, a net negative charge in the form of free electrons is left behind. As the alpha particles are absorbed in collector 12, a potential difference will be created between the emitter 14 and collector 12. The potential difference which exists between the emitter 14 and collector 12 retards the motion of the charged particles towards the collector 12 and thus each charge that reaches the collector 12 has done work on the field. When there is no external circuit, as in the case of the direct nuclear electro-generator 10 shown, the collector 12 receives one unit of charge while the emitter 14 acquires an equal charge of opposite sign. Thus, the potential difference and energy of the field would increase until the retarding field became so great that the charged particles could no longer reach the collector 12. In this manner a direct-nuclear-electro-generator cell or voltage generating device 10 is provided.

Figure 2:
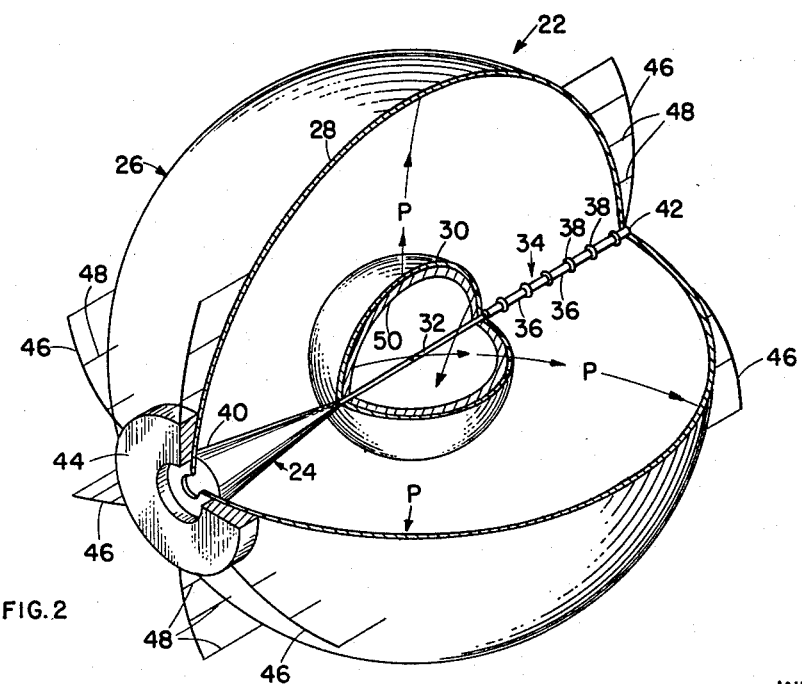
FIG. 2 is a pictorial illustration of the propulsion system invention showing the combining of an electro-generator cell and electrostatic thruster.

In the instant invention, as illustrated in FIG. 2, a propulsion system 22 is shown consisting of an external load in the form of an electrostatic thruster 24 connected to a direct-nuclear-electro-generator 26. More particularly, the generator 26 is comprised of a first spherical thin wall electrically conducting collector 28 having disposed spatially therein a second smaller spherical thin wall electrically conducting emitter 30 such as a metal foil or metal coated plastic. For the collector 28, stainless steel or aluminum are satisfactory and for the emitter 30, stainless steel or molybdenum will suffice, for example. A tubular member 32 constructed of beryllium, for example, is disposed within emitter 30 on a diameter thereof and extends therethrough. One end of the member 32 is fixedly and electrically connected at one end to the thruster 24 and emitter 30. The other end of member 32 is fixedly connected to a forward column 34 which may be comprised of a plurality of alternate beryllium sections 36 and boron nitride insulator segments 38. Column 34 acts as an insulator between emitter 30 and collector 28. The collector 28 is fixedly secured and electrically insulated to the aft portion 40 of thruster 24 and is fixedly secured to the front portion 42 of column 34. An annular payload 44 is externally mounted on the collector 28 and in electrical insulation communication with the aft end 40 of thruster 24. Since the thrust forces are exerted on the thruster exhaust electrode, this location of payload minimizes structural weight. Protruding radially from the outermost portion of the payload 40 and column front end 42 are a plurality of support members 46 made of fiber glass, for example, having guy wires 48 attached thereto and to the collector 28. The wires 48 may be conventional music wire, for example, and aid in supporting the thin wall collector 28.

The electrostatic field between the emitter and the collector attempts to collapse the collector so in addition to wires 48, rotation may be employed to overcome a portion of the electrostatic force in the collector in the concentric sphere configuration by having, for example, the electrostatic thruster exhaust produce a force couple about the axis of the center support column in addition to the propulsion thrust force. A radioisotope film 50 is deposited on the inner surface of emitter 30. As hereinbefore discussed with reference to FIG. 1, particles are produced by the decaying radioisotope. As the particles (P) pass through the emitter 30, a net charge opposite to that of the particles is left behind. As the particles are absorbed in collector 28, a potential difference will be created between the emitter 30 and collector 28 which retards the particle motion toward collector 28 and thus each charge has done work on the field. A potential difference increases until the retarding force becomes so great that the charged particles can no longer reach the collector. A potential difference somewhat less than the stopping potential difference is tapped by the instant invention through the incorporation of thruster 24 to complete the flow of electricity and which utilizes the net potential difference to accelerate charged ions in the thruster 24 to produce thrust. The potential difference of a direct-nuclear-electro-generator wherein decaying radioisotopes are utilized thus provides the source of power to accelerate charged ions in an electrostatic rocket thruster.

Figure 3:
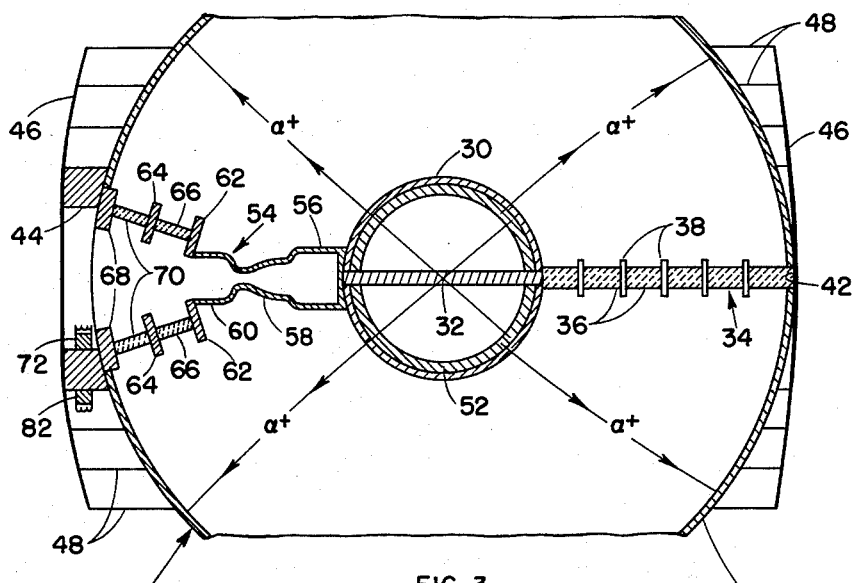
FIG. 3 is an elevation view of the propulsion system invention wherein the electrostatic thruster is shown in schematic form and an alpha-emitting radioisotope is utilized.

FIG. 3 represents in schematic form the propulsion system invention of FIG. 2 wherein an alpha-emitting radioisotope 52, such as polonium 210, is utilized and is disposed on the inner surface of emitter 30. As a result of the decaying radioisotope and interplay between collector 28 and emitter 30, a potential voltage results therebetween. This potential voltage difference may be utilized by an electrostatic rocker thruster 54 such as the colloidal rocker thruster which has been very satisfactorily operated in practice and which is comprised of and utilized as follows. A propellant tank 56 containing propellant such as, for example, mercury chloride or aluminum chloride is fixedly and electrically connected to the bar 32 and emitter 30. The propellants are vaporized by any energy means such as a self-contained resistance heater (not shown) wrapped around the tank 56. Integral with the tank 56 is an expansion chamber 58 in the form of a supersonic nozzle to accelerate the vaporized propellant, thus forming colloidal-sized particles by condensation from the vapor state. The expansion chamber 58 exits into and is integral with a charging chamber 60 wherein each colloidal particle would receive a negative charge by electron attachment. These charging electrons are drawn from the emitter 30 which is negatively charged as a result of the emission of positively-charged alpha particles and flow along the electrically conducting tank 56 and chamber 58 to the charging chamber 60. The tank 56, particle generator 58 and particle charger 60 are all at $-\Phi$ volts, which is the potential of the emitter with respect to space potential. Beam forming electrodes 62 integral with charging chamber 60 focus the ion flow to pass through the exhaust aperture in the exhaust electrode. Self-maintained accelerator 64 secured to but electrically insulated from the electrodes 62 by insulators 66 accelerate the charged particles rearward by providing a potential difference $\Phi_A$. The potential of the accelerator may be obtained by generally conventional means such as a battery or a version of the atomic battery. Decelerator 68 is secured to the payload 44, collector 28 and further secured to accelerator 64 by insulators 70 and is at the collector 28 potential (which is space potential) so that the negatively charged propellant particles fall through voltage $\Phi_A$ and leave the thruster at a velocity corresponding to a voltage $\Phi$. The accel-decel system described above is used to provide a potential barrier to prevent the neutralizing ions or other positively charged particles from back-streaming into the thruster which would constitute a short-circuit. Aside from a small leakage current through insulators and a small current due to a few propellant particles impinging on the accel-electrode, the accel-electrode draws no other current. Thrust is produced by the net force exerted on the accelerator electrode by the electrostatic fields. Total force transmitted by the aft engine insulators 66 and 70 is the sum of the collector guy tension force and the propellant inertial force. All thrusters mentioned herein are assumed to be complete units and have as a necessary component thereof an exhaust beam neutralizer. The neutralization of the exhaust beam of the rocket 54 is provided by a self-contained ion gun 72 which injects positive ions (e.g., $H^+$, $Cs^+$, $Hg^+$) therein. The neutralization atoms may be ionized by electron-bombardment or contact ionization, and the electrons removed in this ionization process would flow to the collector to compensate for the alpha particles there, and thus complete the electric circuit.

Figure 4:
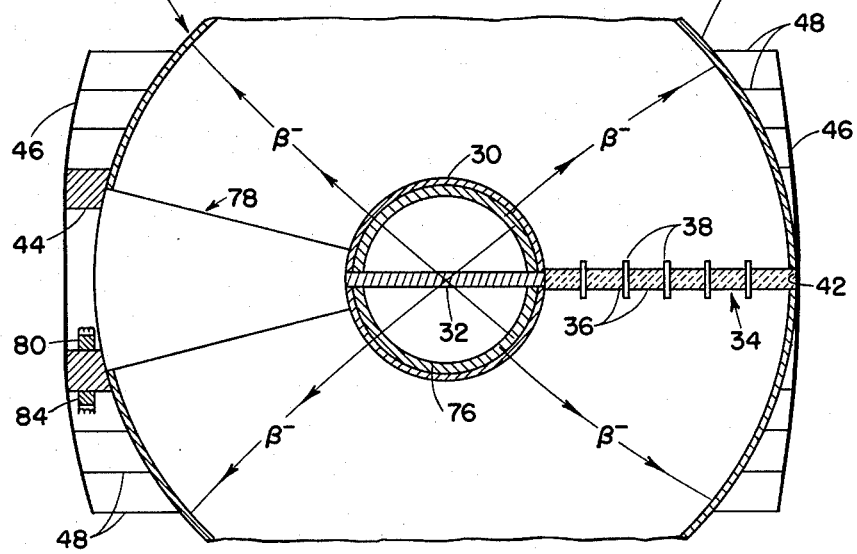
FIG. 4 is an elevation view of the propulsion system invention wherein particle beta-emitting radioisotope is utilized.

The propulsion system invention involving the utilization of negative beta (electron) emitting radioisotopes such as for example Ce–Pr–144 is shown in FIG. 4 wherein a radioisotope Ce–Pr–144 76 is disposed on the inner surface of emitter foil 30. The emitter foil 30 ($\beta^-$ emitter) is at a potential $+\Phi$ above the space potential, so that in this instance the propellant particles must be given a positive charge in thruster 78. During the charging process an electron is removed from the propellant colloidal particle and flows to the emitter foil 30 to compensate for the negative beta (electron) current leaving the emitter 30. The positively charged particles are accelerated and decelerate in much the same fashion as that discussed with reference to FIG. 3 although in order to neutralize the engine exhaust beam when a negative beta emitting radioisotope is utilized, negative charges must be injected therein. The negative charges may be produced by a self-contained electron emitter 80 and therefrom injected into the rocket exhaust beam, and/or drawn from the collector 28 to compensate for the $\beta^-$ current arriving ta the collector 28, and thus complete the electric circuit.

It is possible to further reduce the mass of the instant propulsion system by building a collector of a thin surface or screen mesh which would pass most or all of the alpha or beta particles, but would still act as an electrostatic shield to isolate the emitter from the plasma of space. In the design shown in FIG. 3 and FIG. 4, the emitted particles which pass through the collector would constitute a net current leaving the vehicle shown therein which must be compensated by a current of opposite charge. Since the exhaust beam must be locally neutralized, it cannot be used as the compensation current so some other method is required. This may be easily done in the case of the alpha particle propulsion system by putting a self-contained electron emitter 82 on the outside of the payload which would emit electrons directly to space to compensate for the alpha particles passing through the collector. In the situation of the negative beta propulsion system, self-contained positive ion source 84 is positioned on the external surface of the annular payload to provide positive ions for compensation of the beta particles passing through the collector 28. Electrons removed in the ionization process of the ion gun 84 are directed to the rocket 78 exhaust beam to aid in the neutralization thereof. It is evident that the electron emitter 82 or the ion source 84 could be located at any convenient position on the vehicle.

Figure 5:
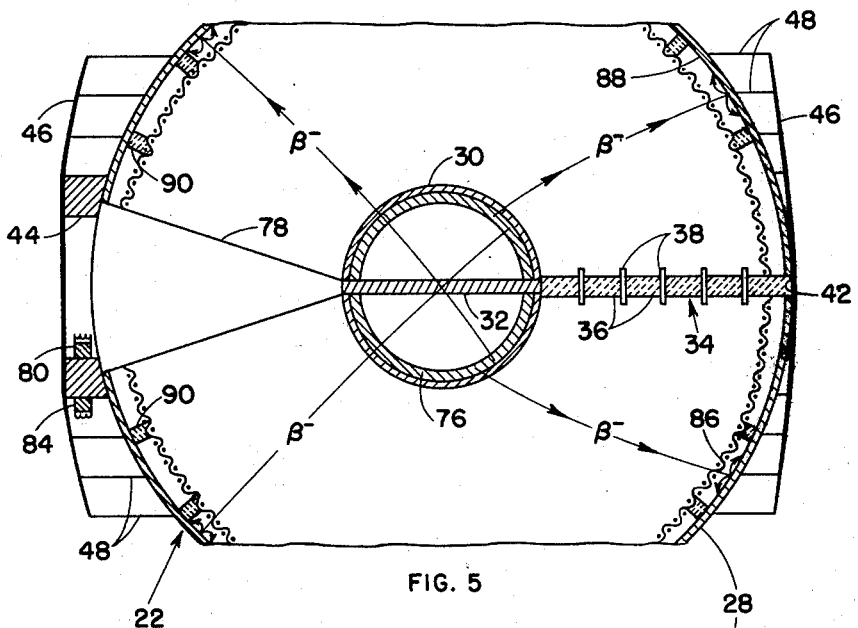
FIG. 5 is an elevation view of the propulsion system invention wherein electron suppressor screens are provided with a beta-emitting electro-generator cell.
Figure 6:
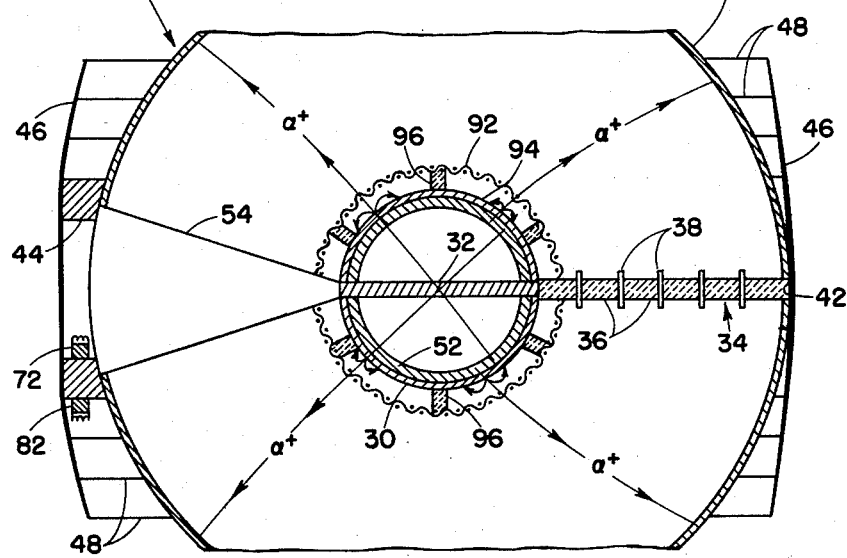
FIG. 6 is an elevation view of the propulsion system invention illustrating the use of electron suppressor screens with the alpha-emitting electro-generator cell.

Under extreme high voltage operating conditions on the order of 1.5 million volts for the alpha particle electro-generator and 700,000 volts for the negative beta particle electro-generator, it may be desirable to suppress secondary electron emission. In the beta propulsion system shown in FIG. 5, the high velocity beta particles traversing or striking the collector 28 may result in the collector 28 giving off secondary electrons. It is evident that an excessive secondary electron emission will constitute a substantial short circuit, thereby decreasing the electric power output from the electro-generator. These secondary electrons may be suppressed by a grid screen 86 positioned at a slight distance from the internal surface 88 of the collector 28 by a plurality of insulators 90 and by providing the grid screen 86 with voltage supply means (not shown) to operate the screen at a voltage with respect to the surface such that the secondary electrons are driven back to the collector 28. In the alpha particle propulsion system shown in FIG. 6, under operating conditions, the alpha particle departure from the emitter foil 30 may initiate ejection of electrons which would result in a short circuit in the cell 22. This is prevented by suppressing the secondary electrons through a grid screen 92 situated a slight distance from the external emitter surface 94 and secured thereto by a plurality of insulators 96 and providing the grid screen 92 with voltage supply means (not shown) to operate the screen 92 at a voltage with respect to the surface such that the electrons are driven back to the emitter surface 94.

It is to be observed that the radioisotope is shown as supported on the inner surface of the support foil. The foil is thin, all particles lose some energy in traversing the foil but two distinct energy spectra are avoided, leading to better efficiency than in the situation where the radioisotope is on the outer surface of the support foil. Additionally, the placing of the radioisotope on the inner surface of the emitter provides a complete enclosure for the radioisotope, thereby retarding losses of radioisotope to space.

For space propulsion, the weight of the powerplant is of major consideration; therefore, all components must be as light as possible. This means that the collector must be as thin as is commensurate with the required mechanical strength. The emitter should be thin enough to prevent excessive energy loss by the particles and any support necessary for the radioisotope materials should be as thin as is consistent with the physical properties of material.

Further it should be evident that the system is to be operated in the hard vacuum of space and thus it is not necessary to pressure seal between the collector 20 and emitter 30. As a concomitant feature the system is resistant to damage of micrometeorites as holes resulting from the penetrating thereof through the collector will not render the system inoperative as would be the situation with conventional schemes using heat rejecting radiators for example.

Obviously, numerous modifications and variations of the present invention are possible in the light of the above teachings. It is, therefore, to be understood that within the scope of the appended claims the invention may be practiced otherwise than as specifically described herein.

What is claimed as new and desired to be secured by Letters Patent in the United States is:

1. A propulsion system comprising alpha radioisotope means for providing alpha particles, collector means for accumulating said alpha particles, said collector means being in nonelectrical communication with said alpha radioisotope means whereby a cell of electrical potential is formed, and a colloidal electrostatic rocket thruster providing negative charged particles, said electrostatic rocket thruster being interconnected with said alpha radioisotope means and said collector means, said thruster utilizing the electric potential created between said radioisotope means and said collector means to accelerate the negative charged particles in said rocket thruster whereby thrust is produced.

2. A propulsion system as in claim 1, including electron emitter means for injecting electrons into the vicinity of said collector means thereby compensating the current of alpha particles passing through said collector means.

3. A propulsion system as in claim 2, including electron suppression means spatially disposed with respect to said radioisotope means for driving secondary electrons back to said radioisotope means.

4. A propulsion system comprising beta radioisotope means for providing beta particles, collector means for accumulating said beta particles, said collector means being in nonelectrical communication with said beta radioisotope means whereby a cell of electrical potential is formed, and a colloidal electrostatic rocket thruster providing positive charged particles, said thruster being interconnected with said beta radioisotope means and said collector means, said thruster utilizing the electric potential created between said radioisotope means and said collector means to accelerate the positive charged particles in said thruster whereby thrust is produced.

5. A propulsion system as in claim 4, including positive ion emitting means for injecting positive ions into the vicinity of said collector means thereby compensating the current of beta particles passing through said collector means.

6. A propulsion system as in claim 5, including electron suppression means spatially disposed with respect to said collector for driving secondary electrons back to said collector.

7. A propulsion system comprising radioisotope means for providing charged particles, collector means for accumulating said charged particles, said collector means being in nonelectrical communication with said radioisotope means whereby a cell of electrical potential is formed, and a colloidal electrostatic rocket thruster for providing particles charged opposite in sign to said collector means interconnecting said radioisotope means and said collector means, said thruster utilizing the potential created between said radioisotope means and said collector means to accelerate the charged particles therein whereby thrust is produced.

8. A propulsion system comprising a rod, a first spherical electrically conductive foil surroundingly disposed with respect to said rod and secured to the end portions of said rod, an insulator having one end thereof secured to said rod, radioisotope means for emitting charged particles disposed on said first foil, said foil attaining a charge opposite in sign to the particles emitted, a second spherical electrically conductive foil for accumulating the charged particles emitted by said radioisotope means, said second foil disposed in surrounding spatial relationship to said first foil, said second foil being secured to the other end of said insulator, said second foil having an aperture therein diametrically opposite the point of second foil-insulator connection, a colloidal electrostatic thruster interconnecting said second foil and said rod, said thruster including electrodes, a charging chamber and propellant, said electrodes being electrically connected to said second foil adjacent to the edge of the aperture, said charging chamber being in electrical communication with said first foil, said charging chamber charging the propellant with the same sign electric charge as said first foil, the charge in said first foil being compensated by electron flow between said charging chamber and said first foil, the electrical potential difference between said second foil and said charged propellant being utilized by the electrodes to effect a force on said charged propellant, thereby imparting a velocity thereto with respect to said propulsion system, the propellant being exhausted through the aperture, and means for neutralizing the exhaust beam of said thruster and for compensating the charge in said second foil.

9. A propulsion system, as in claim 8, including means for current compensating charged particles emitted from said first foil which pass through said second foil.

10. A propulsion system, as in claim 9, including electron suppression means spatially disposed with respect to said first foil and said second foil for driving secondary electrons back to their source.

11. A propulsion system comprising a member, an electrically conductive element surroundingly disposed with respect to said member and secured to said member, radioisotope means for emitting charged particles disposed on said element, said element attaining a charge opposite in sign to the particles emitted, a collector for accumulating the charged particles emitted by said radioisotope means, said collector disposed in surrounding spatial relationship to said element and non-electrically secured thereto, said collector having an aperture therein, a colloidal electrostatic thruster interconnecting said collector and said member, said thruster including electrodes, a charging chamber and propellant, said electrodes being electrically connected to said collector adjacent to the edge of the aperture, said charging chamber being in electrical communication with said element, said charging chamber charging the propellant with the same sign electric charge as said element, the particle charge in said element being compensated by electron flow between said element and said charging chamber, the electrical potential difference between said collector and said charged propellant being utilized by the electrodes to effect a force on said charged propellant, thereby imparting a velocity thereto with respect to said propulsion system, the propellant being exhausted through the aperture, and means for neutralizing the exhaust beam of said thruster and for compensating the particle charge in said collector.

12. A propulsion system, as in claim 11, including means for current compensating charged particles emitted from said radioisotope means which pass through said collector.

13. A propulsion system, as in claim 12, including electron suppression means spatially disposed with respect to said radioisotope means and said collector for driving secondary electrons back to their source.

14. A propulsion system comprising radioisotope means for emitting charged particles, said radioisotope means thereby having a net charge remaining which is opposite in sign to the particles emitted, a collector for accumulating the charged particles emitted by said radioisotope means, said collector secured in electrically insulated surrounding spatial relationship to said radioisotope means, said collector having an aperture therein, a colloidal electrostatic thruster interconnecting said collector and said radioisotope means, said thruster including electrodes, a charging chamber and propellant, said electrodes being electrically connected to said collector adjacent to the edge of the aperture, said charging chamber being in electrical communication with said radioisotope means, said charging chamber charging the propellant with the same sign electric charge as said radioisotope means, the particle charge in said element being compensated by electron flow between said radioisotope means and said charging chamber, the electrical potential difference between said collector and said charged propellant thereby imparting a velocity thereto with respect to said propulsion system, the propellant being exhausted through the aperture, and means for neutralizing the exhaust beam of said thruster and for compensating the particle charge in said collector.

15. A propulsion system, as in claim 14, including compensating means for current compensating charged particles emitted from said first foil which pass through said second foil.

16. A propulsion system, as in claim 15, including electron suppression means spatially disposed with respect to said first foil and said second foil for driving secondary electrons back to their source.

17. A propulsion system comprising beta decaying radioisotope means for emitting beta charged particles, said radioisotope means having a positive charge remaining, a collector for accumulating the beta charged particles emitted by said radioisotope means, said collector secured in electrically insulated surrounding spatial relationship to said radioisotope means, said collector having an aperture therein, a colloidal electrostatic thruster interconnecting said collector and said radioisotope means, said thruster including electrodes, a charging chamber and propellant, said electrodes being electrically connected to said collector adjacent to the edge of the aperture, said charging chamber being in electrical communication with said radioisotope means, said charging chamber charging the propellant with a positive charge, the charge in said radioisotope means being compensated by electron flow from said charging chamber to said radioisotope means, the electrical potential difference between said collector and said charged propellant being utilized by the electrodes to effect a force on said charged propellant, thereby imparting a velocity thereto with respect to said propulsion system, the propellant being exhausted through the aperture, means for neutralizing the exhaust beam of said thruster and for compensating the charge in said collector, and ion source means for current compensating the beta particles which pass through said collector.

18. A propulsion system, as in claim 17, including electron suppression means spatially disposed with respect to said collector for driving secondary electrons back to said collector.

19. A propulsion system comprising alpha decaying radioisotope means for emitting alpha charged particles, said radioisotope means having a negative charge remaining, a collector for absorbing the alpha charged particles emitted by said radioisotope means, said collector secured in electrically insulating surrounding spatial relationship to said radioisotope means, said collector having an aperture therein, a colloidal electrostatic thruster interconnecting said collector and radioisotope means, said thruster including electrodes, a charging chamber and propellant, said electrodes being electrically connected to said collector adjacent to the edge of the aperture, said charging chamber being in electrical communication with said radioisotope means, said charging chamber charging the propellant with a negative charge, the charge in said radioisotope means being compensated by electron flow from said radioisotope means to said charging chamber, the electrical potential difference between said collector and said charged propellant being utilized by the electrodes to effect a force on said charged propellant, thereby imparting a velocity thereto with respect to said propulsion system, the propellant being exhausted through the aperture, and ion neutralizer means for injecting positive ions into the thruster exhaust beam, the electrons removed in the ionization process being directed into the collector to compensate the collector alpha particle charge.

20. A propulsion system, as in claim 19, including electron suppression means spatially disposed with respect to said radioisotope means for driving secondary electrons back to said radioisotope means.

21. A propulsion system comprising decaying radioisotope means for emitting charged particles, said radioisotope means thereby having a charge remaining which is opposite in sign to the particles emitted, electrostatic shield means for shielding said radioisotope means from space potential, said shield means accumulating the charged particles emitted from said radioisotope means, said shield means having an aperture therein for permitting passage of propellant therethrough, a colloidal electrostatic thruster interconnected with said shield means and said radioisotope means, said thruster including electrodes, a charging chamber and propellant, said electrodes being electrically connected to said shield means, said charging chamber charging the propellant with the same sign electric charge as said radioisotope means, the electric potential difference between said shield means and said propellant being utilized by the electrodes to effect a force on said charged propellant, thereby imparting a velocity thereto with respect to said propulsion system, the propellant being exhausted through the aperture in said shield means, means for compensating the charge in said radioisotope means and for compensating the charge in said shield means.

22. A propulsion system, as in claim 21, including electron suppression means spatially disposed with respect to said radioisotope means and said shield means for driving secondary electrons back to their source.

23. A propulsion system, as in claim 21, including means for current compensating charged particles emitted from said radioisotope means which pass through said shield means.

24. A propulsion system, as in claim 23, including electron suppression means spatially disposed with respect to said radioisotope means and said shield means for driving secondary electrons back to their source.

References Cited by the Examiner
UNITED STATES PATENTS

| | | | |
|---|---|---|---|
| 2,517,120 | 8/50 | Linder | 310—3 |
| 2,552,050 | 5/51 | Linder | 310—3 |
| 3,099,131 | 7/63 | Rosa | 60—35.5 |

OTHER REFERENCES

Advanced Propulsion Techniques (Penner), published by Pergamon Press (New York), 1961 (pages 223–227 relied on).

SAMUEL LEVINE, *Primary Examiner.*